United States Patent
De Luca

(10) Patent No.: US 10,920,604 B2
(45) Date of Patent: Feb. 16, 2021

(54) DEVICE FORMING A SEAL FOR A RELIEF VALVE IN A TURBINE ENGINE

(71) Applicant: TRELLEBORG SEALING SOLUTIONS FRANCE, Maisons Laffitte (FR)

(72) Inventor: Michaël De Luca, Vitry sur Seine (FR)

(73) Assignee: Trelleborg Sealing Solutions France, Maisons-Laffitte (FR)

( * ) Notice: Subject to any disclaimer, the term of this patent is extended or adjusted under 35 U.S.C. 154(b) by 386 days.

(21) Appl. No.: 15/528,007

(22) PCT Filed: Nov. 20, 2015

(86) PCT No.: PCT/FR2015/053160
§ 371 (c)(1),
(2) Date: Aug. 8, 2017

(87) PCT Pub. No.: WO2016/079454
PCT Pub. Date: May 26, 2016

(65) Prior Publication Data
US 2018/0171817 A1   Jun. 21, 2018

(30) Foreign Application Priority Data
Nov. 21, 2014 (FR) ...................................... 1461284

(51) Int. Cl.
*F01D 17/10* (2006.01)
*F02C 7/28* (2006.01)
(Continued)

(52) U.S. Cl.
CPC .............. *F01D 17/105* (2013.01); *F02C 6/08* (2013.01); *F02C 7/28* (2013.01); *F04D 27/0215* (2013.01); *F05D 2240/55* (2013.01); *Y02T 50/60* (2013.01)

(58) Field of Classification Search
CPC ...... F01D 17/105; F04D 27/0215; F02C 6/08; F02C 7/28; F16K 3/0218; F05D 2240/55; F05D 2240/57
(Continued)

(56) References Cited

U.S. PATENT DOCUMENTS 4,226,553 A * 10/1980 Whipps ..................... E02B 7/54
                                                           251/328
4,582,080 A *  4/1986 Stock ...................... F16K 1/2285
                                                           137/74

(Continued)

FOREIGN PATENT DOCUMENTS

GB          2245656 A       1/1992

*Primary Examiner* — Kelsey E Cary
(74) *Attorney, Agent, or Firm* — Harness, Dickey & Pierce, PLC

(57) ABSTRACT

The invention relates to a device forming a seal for a relief valve in a turbine engine, the valve comprising: a gate intended for being mounted mobile between a position for sealing an air port made inside a casing of the turbine engine and a position for opening said port, the device comprising: a seal assembly extending along the peripheral edge of the gate in the sealing position thereof, the seal comprising: a main body (19) intended for being inserted sealingly between the peripheral edge of the gate in the closed position thereof and the rim of the port of the casing, and at least one attachment projection (17) extending from at least one portion of the main body (19) and involved in the attachment of the seal to the casing of the engine, said projection (17) being intended for being inserted into a corresponding notch (18) made in the casing.

21 Claims, 5 Drawing Sheets

(51) Int. Cl.
  *F04D 27/02*   (2006.01)
  *F02C 6/08*    (2006.01)

(58) Field of Classification Search
  USPC ............... 251/364, 363, 326, 328, 360, 301
  See application file for complete search history.

(56) References Cited

U.S. PATENT DOCUMENTS

| | | |
|---|---|---|
| 5,044,153 A | 9/1991 | Mouton |
| 5,120,192 A * | 6/1992 | Ohtomo ................ F01D 5/189 |
| | | 415/115 |
| 5,653,423 A * | 8/1997 | Young .................. F16K 3/0227 |
| | | 251/326 |
| 8,152,137 B2 | 4/2012 | Comin et al. |
| 2003/0024510 A1* | 2/2003 | Veinotte ............ F02M 25/0809 |
| | | 123/518 |
| 2010/0068034 A1* | 3/2010 | Schiavo ................ F01D 5/189 |
| | | 415/115 |
| 2012/0233980 A1* | 9/2012 | Heathco ................ F02C 1/007 |
| | | 60/226.1 |
| 2012/0304952 A1* | 12/2012 | Perrin ................ F01N 13/1827 |
| | | 123/188.2 |
| 2013/0092862 A1* | 4/2013 | Mikesell ............... F16K 3/0227 |
| | | 251/326 |
| 2014/0260952 A1 | 9/2014 | Alday et al. |
| 2014/0353538 A1* | 12/2014 | Jeanson ............... F02B 37/004 |
| | | 251/364 |
| 2017/0122435 A1 | 5/2017 | Molina et al. |
| 2018/0163555 A1* | 6/2018 | Snider ................ F01D 11/003 |

\* cited by examiner

Coupe A-A　　　　　　Coupe B-B

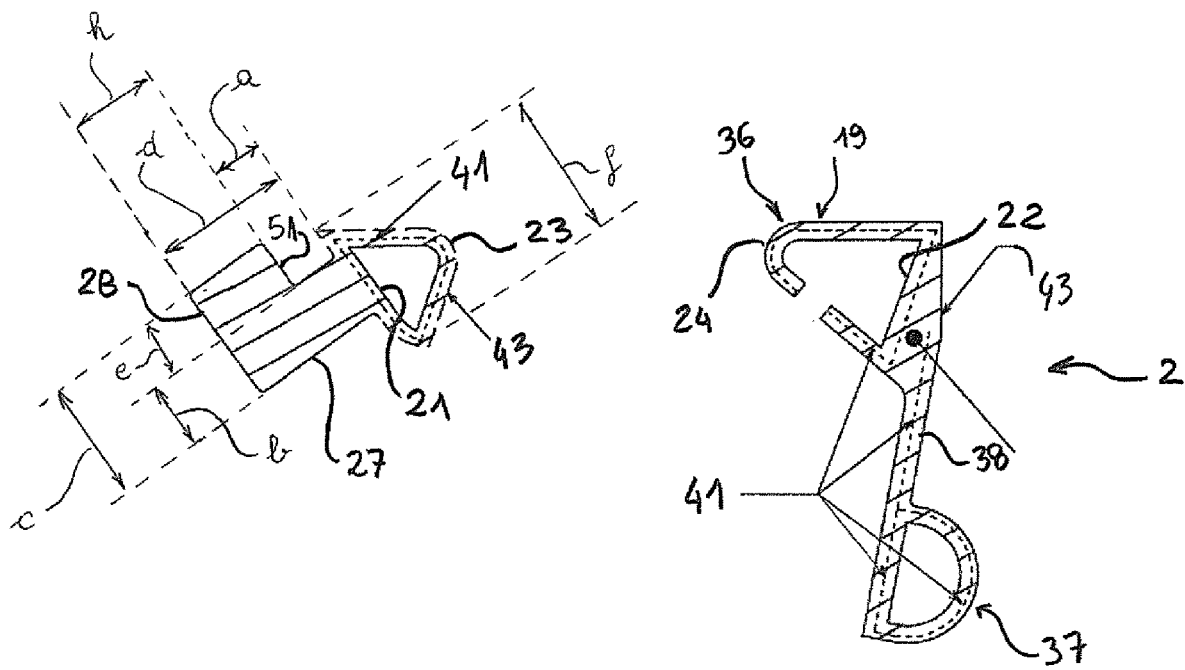
Figure 9
Figure 10
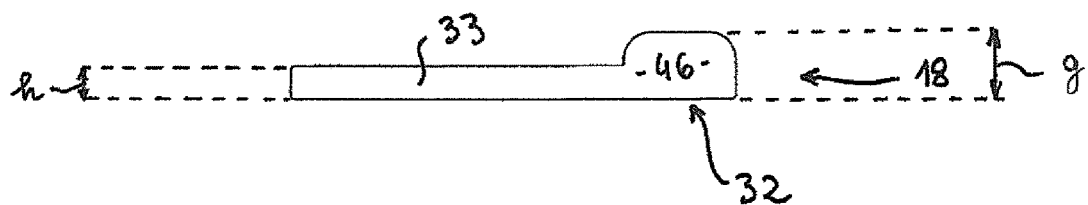
Figure 11a
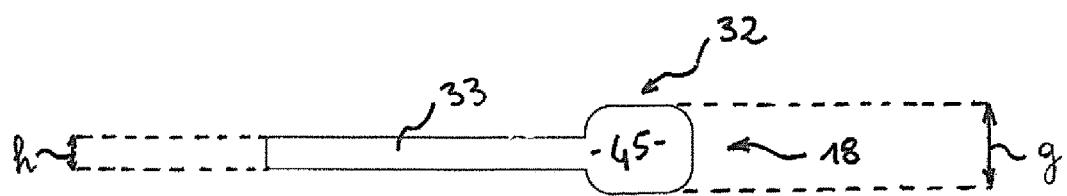
Figure 11b

DEVICE FORMING A SEAL FOR A RELIEF VALVE IN A TURBINE ENGINE

CROSS-REFERENCE TO RELATED APPLICATIONS

This application is a National Phase Entry of International Patent Application No. PCT/FR2015/053160, filed on Nov. 20, 2015, which claims priority to French Patent Application Serial No. 14/61284, filed on Nov. 21, 2014, both of which are incorporated by reference herein.

TECHNICAL FIELD

The invention relates to a seal for a relief valve in a turbine engine. Mare particularly, the field of the invention is that of seals for relief valves for turbofan engines, such as an industrial turbine, or a turbine, a turbojet or a turboprop for an aircraft.

BACKGROUND

Relief valves for turbine engines are typically mounted on the intermediate casing of the turbine engine, between the low pressure compressor and the high pressure compressor, in an annular space extending between the exhaust jet of the main flow and the exhaust jet of the secondary stream. Such relief valves are regularly distributed around the longitudinal axis of the turbine engine and each comprise a gate mobile relative to the intermediate casing, between a position for sealing an air port made inside the intermediate casing and a position for opening said port. The opening of these gates makes it possible to evacuate part of the air of the main flow under some operating conditions of the turbine engine, with said air being fed back into the by-pass flow and/or supplying systems for cooling and/or ventilating components of the turbine engine and/or enabling the expulsion of debris which might impact sensitive areas of the turbine engine. In some embodiments, the gates of the relief valves have a substantially parallelepiped shape and the corresponding ports of the intermediate casing have a shape substantially matching that of the gates.

An elastomeric seal having a generally U-shape extends along the lateral and downstream peripheral edges of each gate and is intended for cooperating with a corresponding portion of the edge of the port of the intermediate casing so as to provide sealing around the gate in the position for sealing said port. Another seal also made of elastomer and having a substantially rectilinear shape completes the contour of the gate to provide sealing around the gate in the position for sealing said port.

According to document FR 2923541, a U-shaped seal of this type is attached to the intermediate casing by means of a U-shaped plate which is applied against a tab-shaped flat portion of the seal, and attached in this pressed position using rivets going through the plate and the tab of the seal. The seal is thus held tightly on the peripheral edge of the gate. The gate and the plate are typically made of metallic material, for example aluminum or titanium.

This type of seal and the system for attaching same to the casing is generally satisfactory. However, increased requirements for limiting the creation of debris for example after an accidental tearing of the seal, encourages the research for a tool-less mounting system, without any added part. However, the system for fixing the seal to the casing meeting such criterion will have to be powerful and robust enough to remain compatible with the application domain where the stresses exerted on the seal when closing and opening the gate are important.

SUMMARY

The invention aims at solving this problem by providing a sealing device forming a seal for a relief valve in a turbine engine which reduces the risk of creating debris after the accidental tearing of the seal while taking advantage of a system for attachment to the casing, meeting high robustness criteria. For this purpose, the invention relates to a device forming a seal for a relief valve in a turbine engine, with the valve comprising a gate intended for being mounted mobile between a position for sealing an air port made inside a casing of the turbine engine and a position for opening said port.

According to the invention, the device comprises:
- a seal assembly extending along the peripheral edge of the gate in the sealing position thereof, with the seal comprising:
- a main body intended for being inserted sealingly between the peripheral edge of the gate and the casing and
- at least one attachment projection extending from at least a portion of the main body and involved in the attachment of the seal to the casing of the engine,
- with said projection being intended for being inserted into a corresponding notch made in the casing.

The specificity of the seal of the invention lies in particular in the presence of projections enabling the attachment of corresponding portions of the casing of the engine, when such projections are inserted into corresponding notches made in the casing. The seal of the invention thus requires no attachment element of the rivet or seal-holder type for the seal parts provided with projections, and reduces the risk of debris resulting from the accidental tearing of the seal being created.

The seal according to the invention can also have one and/or the other of the following characteristics:
- the device comprises a first seal comprising a U-shaped main body and both opposite side portions of which are each extended by an attachment projection
- the projection extends over only a part of both side portions of the first seal
- the projection has a L or T shape in cross-section, the side portions of which are intended for coming into engagement under a corresponding wall of the casing
- the projection comprises a widened portion preventing the sliding of the seal in the notch of the casing
- the main body comprises a hollow core and is thus made deformable
- the free ends of the first seal caps comprise stoppers for preventing the introduction of impurities into the core of the seal
- the main body (19) accommodates a resiliently deformable material in its hollow core
- the central portion of the first seal comprises a secondary body with a hollow core extending along the main body and a flat portion connecting both the main and secondary bodies to each other, and intended for being attached to the casing by a seal holder, with the two main and secondary bodies pointing to opposite directions
- the section of the main body of the central portion is greater than the section of the main body of the side portions of the first seal according to another embodiment, the main body of the first seal may comprise a solid portion consisting of an elastically deformable material, with the main body making it possible to provide sealing for a certain amount of deformation according to still another embodiment, the main body comprises a flexible leaf-shaped portion having a V-shaped section with symmetrical or asymmetrical branches liable to provide sealing when the two portions of the V are folded one against the other the seal comprises reinforcements in the form of internal folds the device comprises a second seal comprising a substantially straight main body intended for closing the U shape of the first seal so that the first and second seals fit the contour of the gate of the relief valve the seal is coated with an anti-friction fabric so as to limit operational friction on the contacting faces, as well as erosion by the impurities present in the flow the seal has support side faces in order to maximize the deflection of the flow when the gate is fully open.

The invention also relates to a gate for a relief valve in a turbine engine intended for being mounted pivoting about an axis between a position for sealing an air port made inside a casing and a position for opening said port, and comprising a peripheral edge along which a device forming a seal of the above type is attached. The invention further relates to a turbine engine, such as an aircraft turbojet or turboprop, which comprises at least one gate for a relief valve of the above type.

BRIEF DESCRIPTION OF THE DRAWINGS

Other data, characteristics and advantages of the present invention will appear upon reading the non restrictive description which follows, while referring to the appended figures which respectively show:

FIG. 9 illustrates a sectional view of the side portion of the first seal provided with the attachment projection outside the casing;

FIG. 10 illustrates a sectional view of the central portion of the first seal provided with a main body and a hollow secondary body connected to each other by a flat portion whereon a seal-holder is applied; and FIGS. 11a and 11b show top views of two alternative embodiments respectively for the notch made in the casing of the turbine engine.

DETAILED DESCRIPTION

Figure 1:
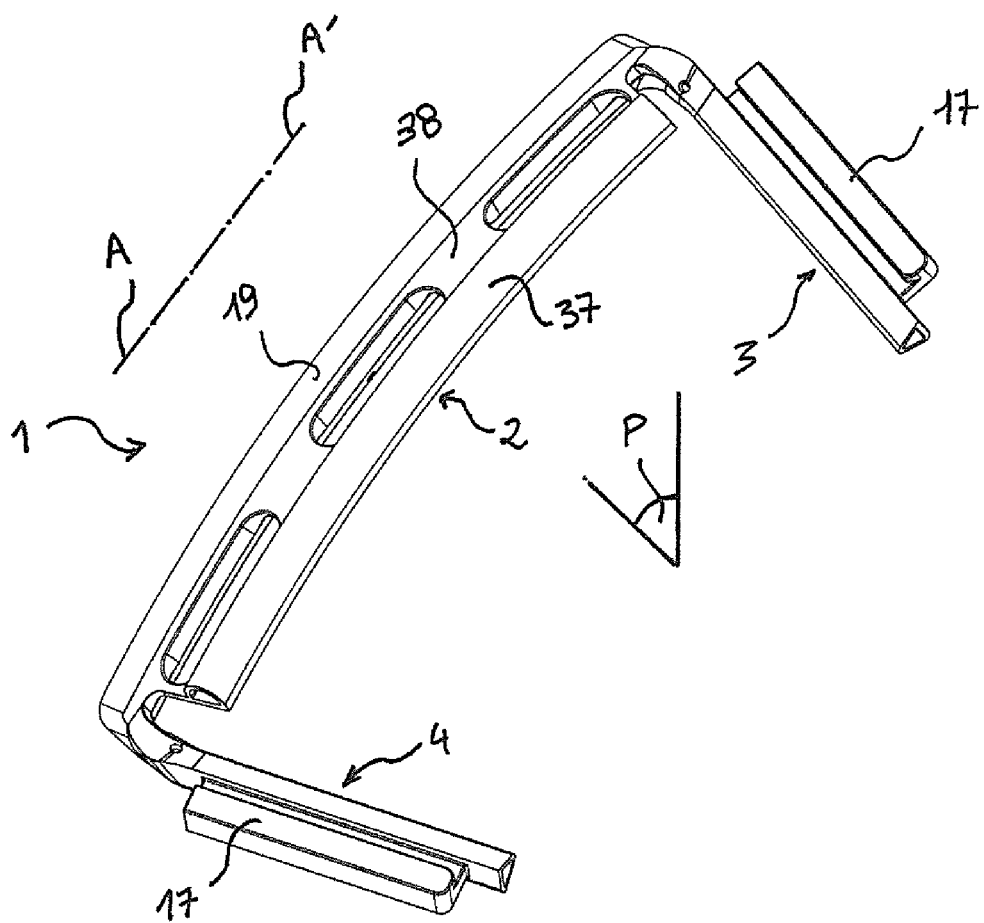
FIG. 1, shows a perspective view of the first seal according to the invention, with a U-shaped section, viewed from the rear so as to highlight the projections to be engaged into matching notches provided in the casing.
Figure 2:
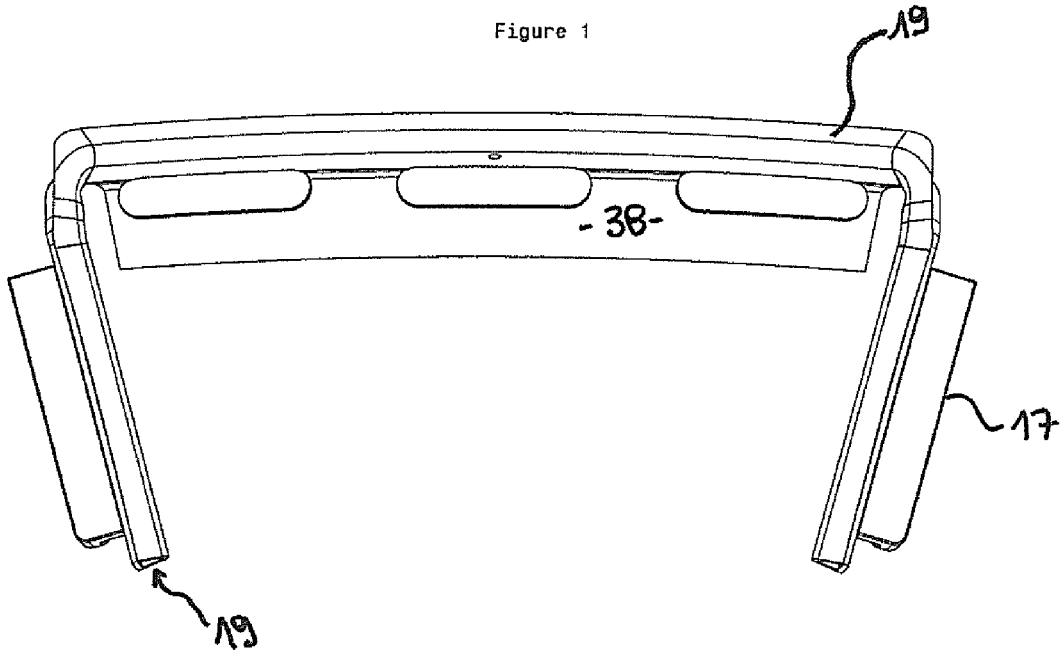
FIG. 2 shows a front view of the seal of FIG. 1.
Figure 3:
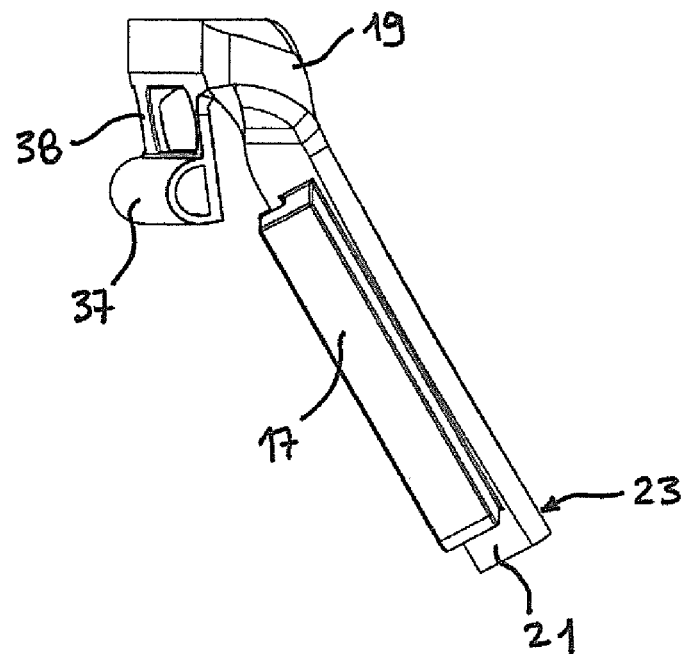
FIG. 3 illustrates a side view of the seal of FIG. 1.
Figure 4:
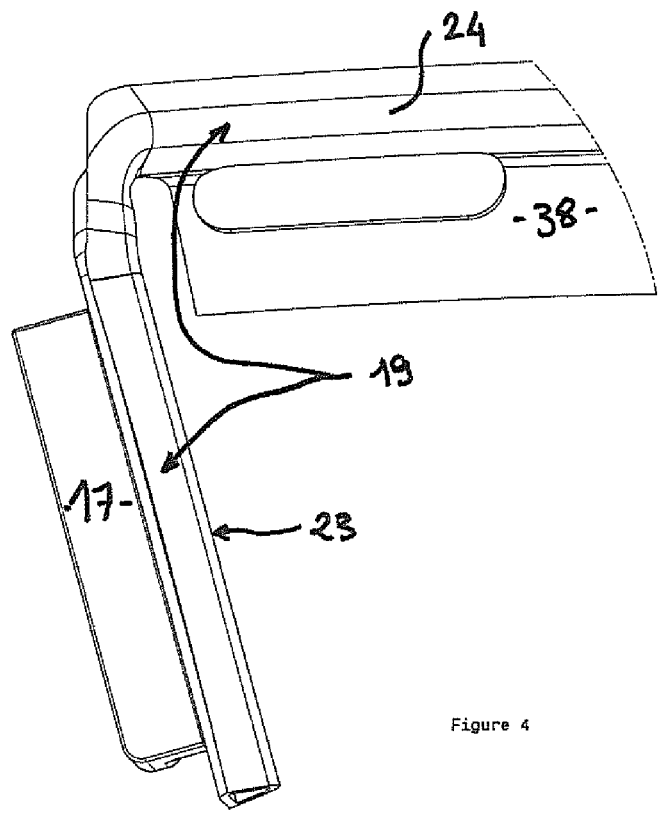
FIG. 4 partially shows the seal of FIG. 1, seen from the front at an angle making it possible to see one of the projections from the front.

The invention relates to an improved device forming a seal for a relief valve in a compressor of a turbofan engine, with such valve being a pivoting gate defining a rectangular outline enabling, in the open position, communication between the primary and the by-pass flows of an aircraft engine. As can be seen in FIG. 1, the device comprises a first generally U-shaped seal 1:

the central portion 2 of which extends along a main axis AA', the side portions 3, 4 extend at the ends of the central portion 2 and form an angle with said central portion, with such first seal being symmetrical with respect to a plane P perpendicular to the main axis.

Figure 5:
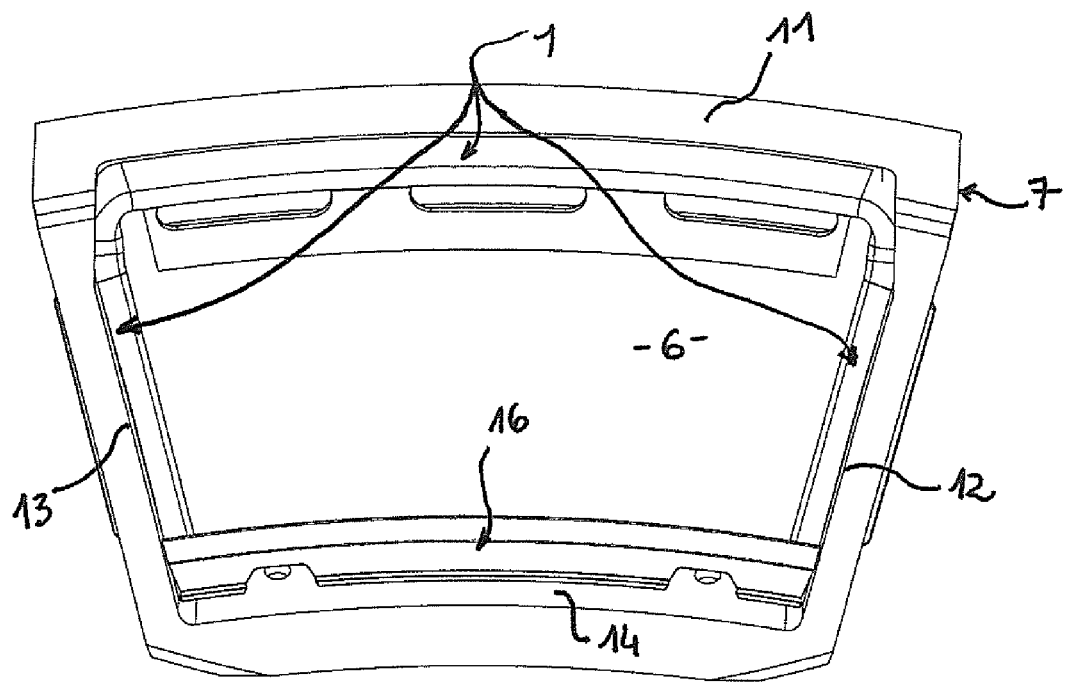
FIG. 5 shows the seal of FIG. 1 attached to the casing of a turbine engine as seen from the front, completed by the bottom seal closing the U.
Figure 6:
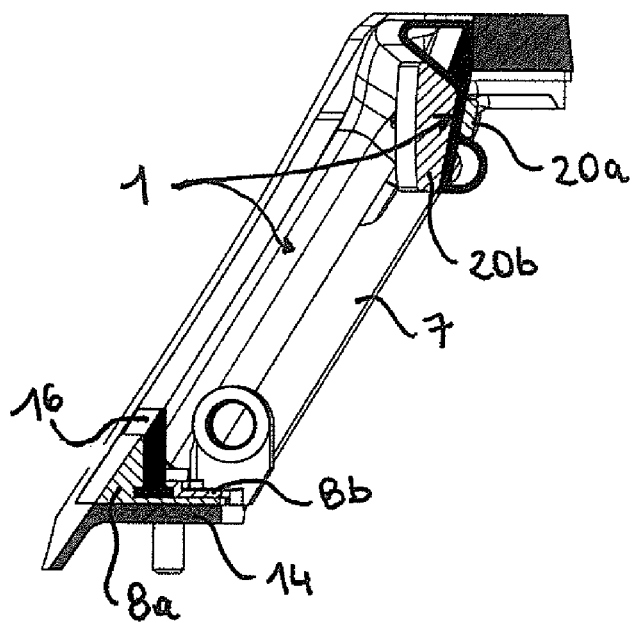
FIG. 6 shows a sectional view of the first seal and the casing of FIG. 5, as well as the second seal along the bottom edge of the port of the casing.

This first seal 1 is intended for being applied, in accordance with FIG. 5, onto the upper rim 11 and the two side rims 12, 13 of a substantially trapezoidal port 6 made in a casing 7 of a turbojet, which explains the 80 degree angle between each side portion 3, 4 and the central portion 2 of the first seal 1, with the trapezium mentioned above having a long upper base 11, slightly recessed relative to a short lower base 14. A second substantially straight seal 16 which can be seen in section in FIG. 6, is accommodated in a seal-holder consisting of two parts 8, which itself is applied against a lower rim 14 of the port made in the casing 7. Conventionally, the central portion 2 of the first seal 1 and the second seal 16 are attached to the casing by means of seal-holders, respectively 20 (consisting of two parts 20a, 20b in FIG. 6) and 8 (in two parts 8a, 8b in FIG. 6). The side portions 3, 4 of the first seal 1 are, on the contrary, innovatively attached to the casing 7 by means of projections 17 which engage into corresponding notches 18 made in the casing.

More specifically, the first seal 1 consists of a hollow main body 19 extending over the entire U-shaped seal and has a substantially triangular cross-section, the base of which comes to rest on the corresponding rims 11 to 13 of the port 6 of the casing 7. As such rims of the casing are inclined at different orientations (substantially vertically for the upper rim 11 according to FIG. 6, and slightly converging towards each other away from the gate for the two lateral rims 3, 4), the bases 21, 22 of the triangular section of the hollow body have orientations matching those of the corresponding rims of the casing 11-13.

One of the apexes 23, 24 of the triangle of the triangular cross-section points opposite the base 21, 22 of the hollow main body, thus forming a hollow dome, which is crushed and deformed by the gate of the valve relief upon closing thereof. The hollow shape thereof specifically enables it to deform sufficiently to provide sealing whereas it is not necessarily compressible. As a matter of fact, this body is chosen to be hollow to be deformable enough to provide a perfect sealing when the gate is closed without requiring the use of a too powerful actuating system, i.e. a perfect tightness necessary to get the maximum performance from the turbine, when the gate is closed.

Besides, the side portions of the seal comprise domes with identical sections, and smaller than that of the dome of the central portion 2. The section of the dome of the hollow body 19 changes in dimensions between the major section of the central portion and the smaller portion of the side portions (see FIG. 7) at the elbow-shaped connection between each side portion 3, 4 and the central portion 2.

Figure 7:
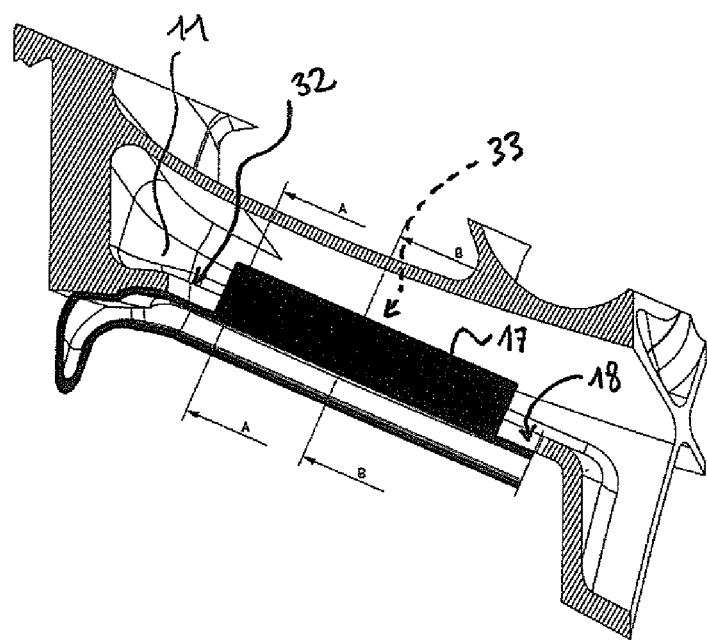
FIG. 7 shows a sectional view along one of the projections of the first seal, the first seal attached to the casing by engagement of the projection into the corresponding notch of the casing.
Figure 8:
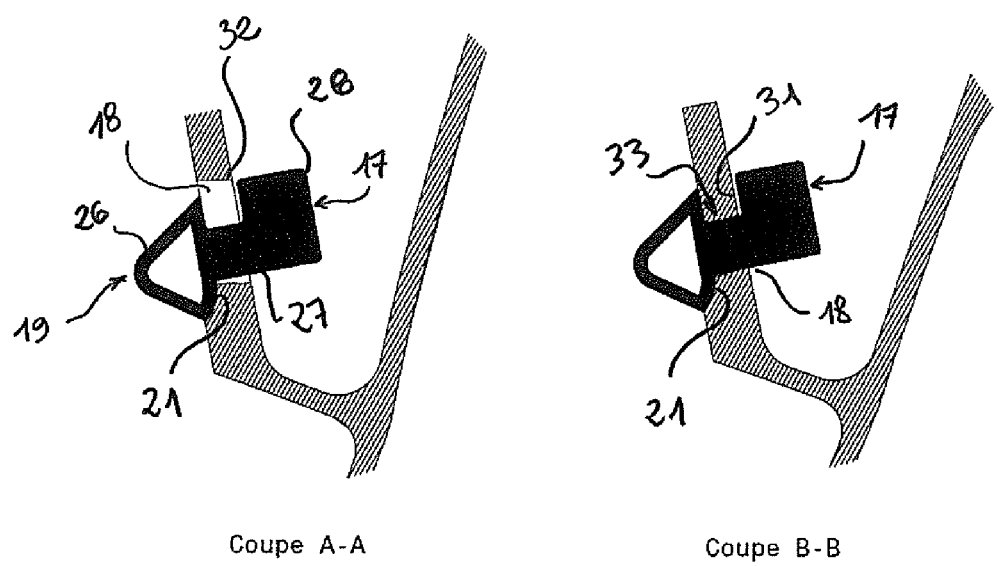
FIG. 8 shows two sectional views of the first seal attached to the casing along the line AA of FIG. 7 and the line BB of the same figure.

As can be seen in FIG. 8, the base 21 of the hollow body of each side portion of the first seal is extended, opposite the small dome 26, by the projection 17 which has a generally L-shaped cross-section, the first branch 27 of which is perpendicular to the base 21 and the second branch 28 of which is parallel to the base 21 although spaced therefrom by a distance "a" marked in FIG. 9. As can be seen in FIG. 7, such projection 17 extends over only a part of the side portion of the first seal, over a length extending away from the elbow of the seal up to a distance from the end of the side portion of the seal. As can be seen in FIG. 8, in cross-section BB, the portion 28 of the projection abuts against a wall portion 31 defining the notch 18, and forms an anchoring post 28.

The asymmetric shape of the (L-shaped) post of the attachment projection makes it possible to accommodate the post in an inner zone of the casing where the available space is small because of the important cluttering. Of course, any other shape, for example a T-shape, making it possible to define a resting portion against the wall delimiting the notch, is possible. The notch has a generally straight shape with an inlet 32 giving way by simple introduction of the projection 17 in a direction normal to the plane defined by the rim 12, 13, (with a circular shape, for instance) and a straight passage 33 tightened enough to prevent the post 28 from leaving the projection, with such channel 33 actually having substantially the same width "b" as the portion 27 of the projection. In the illustrated example, the inlet 32 is located on the upper rim 11 side and is covered by the elbow of the first seal when the latter is correctly positioned.

The projection 17 is thus inserted through the front end of the post 28 into the inlet 32 of the corresponding notch 32 and this front end is then engaged into the narrow channel 33 of the notch 18 under the casing wall so as to be locked there. The inlet of the notch may, according to FIGS. 11a and 11b have a shape adapted to that of the projection post and thus a square shape 45 centered on the channel 33 when the projection post has a T shape, or that of a substantially rectangular notch, in addition to the channel 33 when the projection post on the contrary has a T shape.

Besides, the central portion 2 of the first seal has a cross-section having the general shape of a S which defines, opposite the dome of the hollow body thereof with a major section 36, a secondary dome 37 having a semi-circular section, the diameter of which is connected to the base 22 of the main dome 36, by a flat portion 38 of the first seal. The secondary dome 37 is intended for maximizing the performances of the extraction system when the gate is fully open. The hollow core domes 23, 36,37 enable large amounts of deformation with, for instance, a compression of their section of the order of 80 or even 100%, even when the material the seal is made of is not compressible (such as reinforced or unreinforced rubber). The hollow core of the domes allows a degree of deformation that the material the seal is made of would not.

For example, to deform a 8 mm dome, a hollow core with a 10 mm height can be provided. The dimensions of the dome (the wall thickness and the size of the hollow core) will be thus be adapted to the movement amount required to secure a suitable compression ratio upon closing the gate and thus the desired sealing. To protect the hollow core of the main body of the seal, the lower ends of the side portions are provided with stoppers for preventing impurities (sand or water) from being introduced into the core of the seal. Of course, the hollow body of the first seal may have a constant, or variable section and for example a larger one where the shear stress created upon closing the gate is more important (since, although the pivoting axis of the gate is different from that of the seal, and enables a relatively uniform distribution of such stress across the seal, the lower ends of the U-shaped part of the seal, are more stressed than the rest of this part).

Relative Dimensions let a notch have, according to FIG. 11, a substantially circular inlet 32 with a diameter "g", and a channel 18 with a width "h". The diameter "g" of the inlet 32 will be provided so as to be slightly greater than twice the width "h" of the channel (for instance g=8.5 or 9 mm and h=4 mm)

the dome carrying the projection will have a width "f" slightly greater than that of the inlet 32 of the notch, so as to cover same when the seal is attached to the casing (for instance f in FIG. 8=10 mm) and will necessarily cover the channel 18 over the entire width and the entire length thereof the height "d" of the post will be slightly greater than the width "f" of the dome (for example d=11.7 mm)

the distance "a" between the base of the dome relative to the surface 51 through which the post is engaged in the casing wall is substantially equal to the thickness of the casing, for example a=4 mm the width "c" of the post length (portion 28)

the width "c" of the post length (portion 28) is provided to be slightly smaller than that "f" of the dome (for instance c=8 mm)

the width "b" of the post portion going through the casing wall, is provided to be half the width "c" of the post length (for instance b=4 mm)

the length "e" of the surface 51 through which the post is engaged under the casing wall is substantially equal to the width "b" of the post portion going through the casing wall (for example e=4 mm).

The width "e" of the post engaging surface 51 and the height "h" of the post portion 28, can be adapted to the rigidity to be achieved for the post (when such values increase, the amount of material and the stiffness increase) or, on the contrary, maintained at minimum values (for example e=b=h) if fold reinforcements are provided within the post. "Slightly higher or lower" as mentioned above, should be understood as a difference of the order of 5 to 20%.

According to one not shown embodiment, the post portion which extends over the height "a" going through the casing wall may have a shape substantially matching that of the notch of FIG. 11a or 11b and thus comprise a head for locking in the notch matching the circular shape of the inlet 32 of the notch and preventing the translation of the side portion of the seal in the notch. According to the embodiment illustrated in FIG. 7, the post may instead have a shorter length than that of the notch and the seal dome will cover the notch on either side of the post. The translational locking of the side seal portion will be made possible by locking the seal-holder of the central portion of the seal.

Constituent Materials

The material of this seal may be elastomer, such as silicone, and preferably have self-extinguishing properties. As can be seen in FIG. 9 or 10, the dome of each portion of the first seal comprises reinforcing folds improving its rigidity while allowing its deformation. The central portion 2 of the first seal also comprises reinforcements as folds 41 which extend in the thickness of the flat portion 38 thereof and in that of the secondary dome 37. Such folds or reinforcements 41 maybe made of polyester fabric, which has the advantage of strengthening the seal to make it resistant in preferential zones (two parallel folds can be seen in the thickness of the projection post to make it all the more rigid and a single fold can be seen in the dome 19 of the hollow body so that it is stiffened while retaining some flexibility).

Polyester fabric is also advantageous as regards the cost of material. Other types of reinforcements can also be used such as carbon or glass or ceramics fibers, but in a limited amount in the domes of the hollow bodies, to avoid too high rigidity and impeding their deformation. All these reinforcements may be present as flexible textile and/or rigid composite reinforcements.

The first seal is also coated with an antifriction fabric 43 which reduces friction to the advantage of the valve gate closing energy. Its presence is especially advantageous for the first seal according to the invention when it is made of silicone which has a high friction characteristic. Coating the seal silicone with an anti-friction fabric thus enables an effortless sliding of the peripheral edge of the gate along the seal domes. The anti-friction fabric also makes it possible to achieve low wear rate for this seal, and protects same against abrasion which may be caused by the presence of sand or ice crystals in the environment of the valve.

Production Method

The first seal having a generally U shape with integrated folds can be obtained by molding. Such folds are initially cut and positioned in a molding tool comprising a cavity having the desired final shape for the first seal. These folds are coated with silicone to provide the seal with its basic shape. The mold is closed for the vulcanization of silicone at/under predetermined temperature and pressure known by a person skilled in the art.

According to another not shown embodiment, the dome of the first seal may comprise a solid core consisting of a compressible material more suited to very large parts. For example, the solid dome may consist of compressible foam coated with an anti-friction material. Or according to still another embodiment, the first seal may comprise, instead of a prominent dome, a flexible leaf-shaped portion having a V-shaped section the two portions of which are folded one against the other upon closing the gate against the rims of the port of the casing. In the last two variants, the first seal will always be provided with projections for attachment thereof to the casing.

The device forming a seal as described above is particularly suitable for valves for turbofan engines but can perfectly equip valves for single-flow turbines, whether the gates of such valves are closed "flat" on the seal or using a pivoting system. It may also be suitable for relief gates which protect a system against overpressure (for instance industrial turbines the gates of which are provided with an "off-off" valve system which prevents any overpressure in the turbine). Such gates may be made of metallic, composite or plastic materials.

The invention claimed is:

1. A device forming a seal for a relief valve in a turbine engine, the device comprising:
   the seal comprising:
      a deformable main body; and
      an attachment projection extending from a first side portion of the main body;
   wherein the main body forms a hollow dome having a base that is the first side portion and an apex opposite to the base;
   wherein the attachment projection is configured to be inserted into a corresponding notch made in a casing of the turbine engine and to attach the seal to the casing; and
   wherein the base is configured to rest on rims of the notch of the casing.

2. A device according to claim 1, wherein the main body comprises a central portion, the first side portion extending from a first side of the central portion, and a second side portion extending from a second side of the central portion, the central portion, the first side portion, and the second side portion forming a U-shape.

3. A device according to claim 2, wherein the attachment projection extends over only a part of the first side portion.

4. A device according to claim 2, wherein an end of the first side portion and an end of the second side portion are closed.

5. A device according to claim 2, wherein the central portion of the seal comprises:
   a secondary body extending along the main body; and
   a flat portion connecting the main body with the secondary body;
   wherein the main body and the secondary body point in opposite directions.

6. A device according to claim 2, wherein a section of the central portion is greater than a section of the first side portion and a section of the second side portion.

7. A device according to claim 1, wherein the attachment projection has a L or T shape in cross-section.

8. A device according to claim 1, wherein the attachment projection comprises a widened portion configured to prevent sliding of the seal in the notch of the casing.

9. A device according to claim 1, wherein the main body comprises a hollow core.

10. A device according to claim 9, wherein the main body accommodates a resiliently deformable material in the hollow core of the main body.

11. A device according to claim 1, wherein the main body comprises a solid portion of elastically deformable material, and the seal is a turbofan engine compressor, relief valve seal.

12. A device according to claim 1, wherein the main body comprises a flexible leaf-shaped portion having a V-shaped section with symmetrical or asymmetrical branches configured to provide sealing when two portions of the V-shaped section are folded one against another.

13. A device according to claim 1, wherein the seal is coated with an anti-friction material.

14. A device according to claim 1, wherein the attachment projection is a first attachment projection, the device further comprising a second attachment projection extending from a second side portion.

15. A device according to claim 14, wherein the first attachment projection extends away from the second attachment projection.

16. A device according to claim 1, wherein the main body further comprises one or more reinforcements.

17. A seal for sealing a relief valve in a turbine engine, the seal comprising:
   a deformable U-shaped main body having a central portion, a first side portion coupled to the central portion, and a second side portion coupled to the central portion opposite the first side portion;
   a first attachment projection extending from the first side portion; and a second attachment projection extending from the second side portion, the first attachment projection and the second attachment projection extending in opposite directions;

wherein the first attachment projection and the second attachment projection are configured to be inserted into corresponding notches made in a casing of the turbine engine; and wherein the main body has a triangular cross-section.

18. The seal according to claim 17, wherein the main body forms a hollow dome having a base which rests on rims of the notches, and the seal is a turbofan engine compressor, relief valve seal.

19. The seal according to claim 17, wherein the first attachment projection and the second attachment projection have an L-shaped or T-shaped cross-section.

20. A seal for use in a relief valve in a turbine engine, the seal comprising:

a hollow main body having a triangular cross-section, the main body comprising:

a central portion having a first end and a second end;

a first side portion extending from the first end of the central portion, the first side portion having a first base and a first apex opposite the first base; and a second side portion extending from the second end of the central portion, the second side portion having a second base and a second apex opposite the second base, and the second apex facing the first apex;

wherein the central portion, the first side portion, and the second side portion form a U-shape;

a first attachment projection extending along a length of the first side portion from the first base; and a second attachment projection extending along a length of the second side portion from the second base.

21. The seal according to claim 20, further comprising a secondary body having a hollow core extending along the central portion of the main body and a flat portion connecting the secondary body with the central portion of the main body.

* * * * *